US009163681B2

(12) United States Patent
Akita et al.

(10) Patent No.: US 9,163,681 B2
(45) Date of Patent: Oct. 20, 2015

(54) BRAKE DEVICE, FRICTION COUPLE FOR BRAKE DEVICE, AND BRAKE PAD

(75) Inventors: Yosuke Akita, Susono (JP); Kazutoshi Nishii, Susono (JP); Ryutaro Misumi, Susono (JP); Hiroshi Isono, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 158 days.

(21) Appl. No.: 13/638,770

(22) PCT Filed: Jun. 4, 2010

(86) PCT No.: PCT/JP2010/059553
§ 371 (c)(1),
(2), (4) Date: Oct. 1, 2012

(87) PCT Pub. No.: WO2011/151925
PCT Pub. Date: Dec. 8, 2011

(65) Prior Publication Data
US 2013/0020154 A1 Jan. 24, 2013

(51) Int. Cl.
*F16D 65/092* (2006.01)
*F16D 65/02* (2006.01)

(52) U.S. Cl.
CPC ............ *F16D 65/092* (2013.01); *F16D 65/028* (2013.01)

(58) Field of Classification Search
CPC .................. F16D 2062/022; F16D 65/028
USPC ........ 188/250 G, 250 B, 218 XL; 192/107 R, 192/110 B, 70.11, 70.14, 66.21
See application file for complete search history.

(56) References Cited

U.S. PATENT DOCUMENTS

| | | | | |
|---|---|---|---|---|
| 585,328 | A * | 6/1897 | Humphrey et al. | 188/25 |
| 665,306 | A * | 1/1901 | Boyd | 188/25 |
| 2,064,791 | A * | 12/1936 | Faber | 52/167.5 |
| 3,168,176 | A * | 2/1965 | Straub | 192/84.91 |
| 3,307,605 | A * | 3/1967 | Bulgin et al. | 152/209.1 |
| 3,514,319 | A * | 5/1970 | Hata | 428/450 |
| 3,625,318 | A | 12/1971 | Wymann | |
| 4,823,916 | A * | 4/1989 | Shyu | 188/24.12 |

(Continued)

FOREIGN PATENT DOCUMENTS

| | | |
|---|---|---|
| JP | 59 112038 | 7/1984 |
| JP | 10 141397 | 5/1998 |

(Continued)

OTHER PUBLICATIONS

International Search Report Issued Jun. 29, 2010 in PCT/JP10/59553 Filed Jun. 4, 2010.

*Primary Examiner* — Bradley King
(74) *Attorney, Agent, or Firm* — Oblon, McClelland, Maier & Neustadt, L.L.P.

(57) ABSTRACT

A brake device includes a first member having holders, each of the holder configured to be in contact with a corresponding rolling body and hold the rolling body rotatably; a second member provided in contact with the rolling body and configured to rotate the rolling body in the holder according to a relative displacement with the first member; and a pressing mechanism configured to press the first member and the second member against each other. This makes it possible appropriately to set performance regardless of, for example, a projecting area of a surface of the first member, the surface being pressed by the second member.

19 Claims, 10 Drawing Sheets

(56) References Cited

U.S. PATENT DOCUMENTS

| | | | |
|---|---|---|---|
| 5,104,361 A * | 4/1992 | Jenkins | 475/184 |
| 5,617,935 A * | 4/1997 | Chuang et al. | 188/73.1 |
| 5,868,226 A | 2/1999 | Vranish | |
| 5,887,683 A * | 3/1999 | Yamashita | 188/24.19 |
| 6,939,044 B1 | 9/2005 | Lyon et al. | |
| 7,815,020 B2 * | 10/2010 | Djordjevic | 188/72.3 |
| 2012/0037465 A1 | 2/2012 | Abe et al. | |

FOREIGN PATENT DOCUMENTS

| | | | | |
|---|---|---|---|---|
| JP | 2000 226552 | | 8/2000 | |
| JP | 2001227583 A | * | 8/2001 | F16F 15/02 |
| JP | 2002 257168 | | 9/2002 | |
| JP | 2003 513203 | | 4/2003 | |
| JP | 2008-281207 A | | 11/2008 | |
| JP | 5141821 B2 | | 2/2013 | |

\* cited by examiner 301 (302, 304)

301 (302, 304)

BRAKE DEVICE, FRICTION COUPLE FOR BRAKE DEVICE, AND BRAKE PAD

FIELD

The present invention relates to a brake device, a friction couple for a brake device and a brake pad.

BACKGROUND

As a conventional brake device such as a disk brake, for example, Patent Literature 1 discloses friction surface coating for a friction material of a brake device, in which a pad friction flat-surface of a brake pad is pressed against the disk friction flat-surface of a disk rotor rotating together with a wheel, and braking force is applied to the wheel by virtue of frictional force between the disk friction flat-surface and pad friction flat-surface according to the sliding of the one flat-surface against the other.

CITATION LIST

Patent Literature

Patent Literature 1: Japanese Patent Application Laid-open No. 2000-226552

SUMMARY

Technical Problem

However, the friction surface coating for friction material of a brake device described as in the foregoing Patent Literature 1 needs to be improved since friction performance and wear resistance performance are determined according to, for example, the projecting area of a friction surface.

The present invention has been proposed in view of the foregoing problem. Accordingly, it is an object of the present invention to provide a brake device, a friction couple for a brake device, and a brake pad, which allow preferable performance settings.

Solution to Problem

In order to achieve the above mentioned object, a brake device according to the present invention includes a first member having holders, each of the holder configured to be in contact with a corresponding rolling body and hold the rolling body rotatably; a second member provided in contact with the rolling body and configured to rotate the rolling body in the holder according to a relative displacement with the first member; and a pressing mechanism configured to press the first member and the second member against each other, wherein while the first member and the second member are pressed against each other, the relative displacement of the first member and the second member is braked by frictional force generated between the rolling body and the holder when the second member rotates the rolling body according to the relative displacement.

Further, it is possible to configure that the first member is not able to rotate together with a wheel, and the second member is able to rotate together with the wheel.

Further, it is possible to configure that the holder and the second member are configured such that force with which the rolling body is rotated by the second member is greater than force with which the rolling body is held by the holder.

Further, it is possible to configure that the holder and the second member are configured such that magnitude relation between the force with which the rolling body is rotated by the second member and the force with which the rolling body is rotated by the holder reverses according to temperature increase of the holder or the rolling body.

Further, it is possible to configure that a friction coefficient of the contact portion of the holder and the rolling body increases according to temperature increase of the holder or the rolling body.

Further, it is possible to configure that a friction coefficient of the contact portion of the second member and the rolling body decreases according to temperature increase of the holder or the rolling body.

Further, it is possible to configure that the holder has a holding groove configured to hold the rolling body.

Further, it is possible to configure that the rolling body is spherical, the holding groove has a shape of a cone or truncated cone, and the holder and the second member are formed such that a relation between a friction coefficient $\mu_1$ of the contact portion of the second member and the rolling body, a friction coefficient $\mu_2$ of the contact portion of the holder and the rolling body, and an angle $\beta$ formed between a normal line of a wall surface of the holder in the contact portion of the holder and the rolling body and a direction of pressure of the pressing mechanism satisfy $\mu_1 > (\mu_2/2) \cdot [(2\beta/\sin 2\beta) + 1]$.

Further, it is possible to configure that the angle formed between the normal line of the wall surface of the holder in the contact portion of the holder and the rolling body and the direction of pressure of the pressing mechanism increases according to temperature increase of the holder or the rolling body.

Further, it is possible to configure that the second member has an accommodating groove formed in the contact portion of the second member and the rolling body in the direction of the relative displacement, and configured to accommodate a part of the rolling body.

Further, it is possible to configure that the first member has a plurality of the rolling bodies and a plurality of the holders, and is provided with a distributing portion disposed between the holders and a support member to which pressure is applied by the pressing mechanism and configured to distribute the pressure.

In order to achieve the above mentioned object, a friction couple for a brake device according to the present invention includes a first member having holders, each of the holder configured to be in contact with a corresponding rolling body and hold the rolling body rotatably; and a second member provided in contact with the rolling body and configured to rotate the rolling body in the holder according to a relative displacement with the first member, wherein while the first member and the second member are pressed against each other, the relative displacement of the first member and the second member is braked by frictional force generated between the rolling body and the holder when the second member rotates the rolling body according to the relative displacement.

In order to achieve the above mentioned object, a brake pad according to the present invention includes holders provided on a surface pressed against a disk rotor rotating together with a wheel, each of the holder configured to be in contact with a corresponding rolling body and hold the rolling body rotatably, wherein while the brake pad is pressed against the disk rotor, a relative displacement between the brake pad and the disk rotor is braked by frictional force generated between the rolling body and the holder when the disk rotor rotates the rolling body according to the relative displacement.

Advantageous Effects of the Invention

A brake device, a friction couple for a brake device, and a brake pad according to the present invention yield an advantageous effect that allows preferable performance settings.

DESCRIPTION OF EMBODIMENTS

Embodiments of a brake device, a friction couple for a brake device, and a brake pad, according to the present invention, will be described in detail below with reference to the drawings. It should be understood that the present invention is not limited to these embodiments. It should also be understood that the constitutional elements in the embodiments below include ones that could easily be substituted or anticipated by those skilled in the art, or with ones that are substantially identical to the constitutional elements.

First Embodiment

Figure 1:
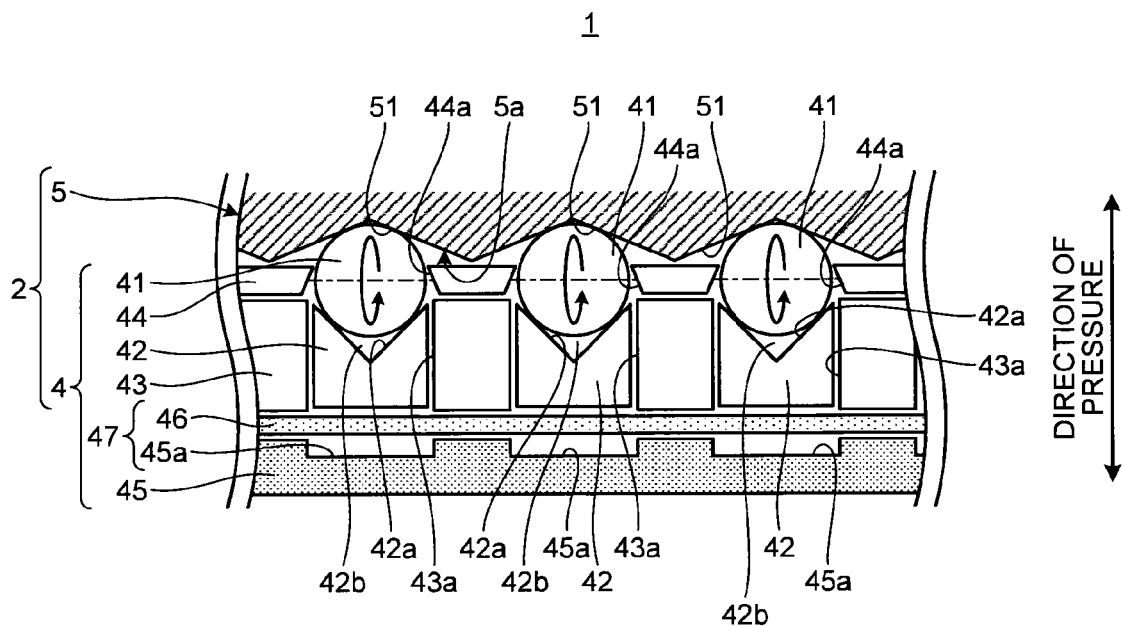
FIG. 1 is a partial cross-sectional view schematically illustrating a friction couple for a brake device according to First Embodiment.
Figure 2:
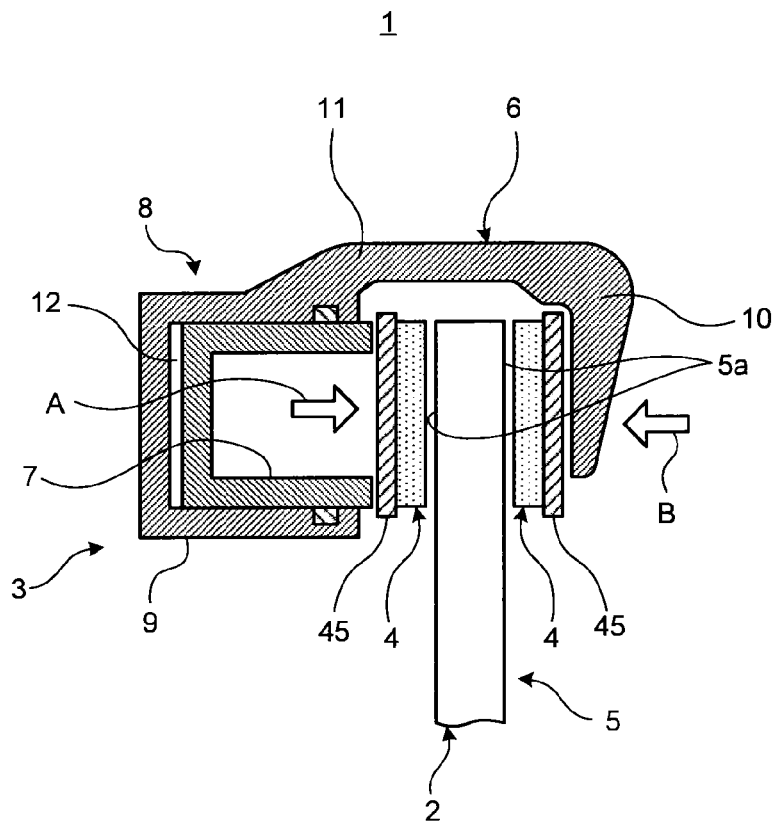
FIG. 2 is a schematic cross-sectional view schematically illustrating the configuration of the brake device according to First Embodiment.
Figure 3:
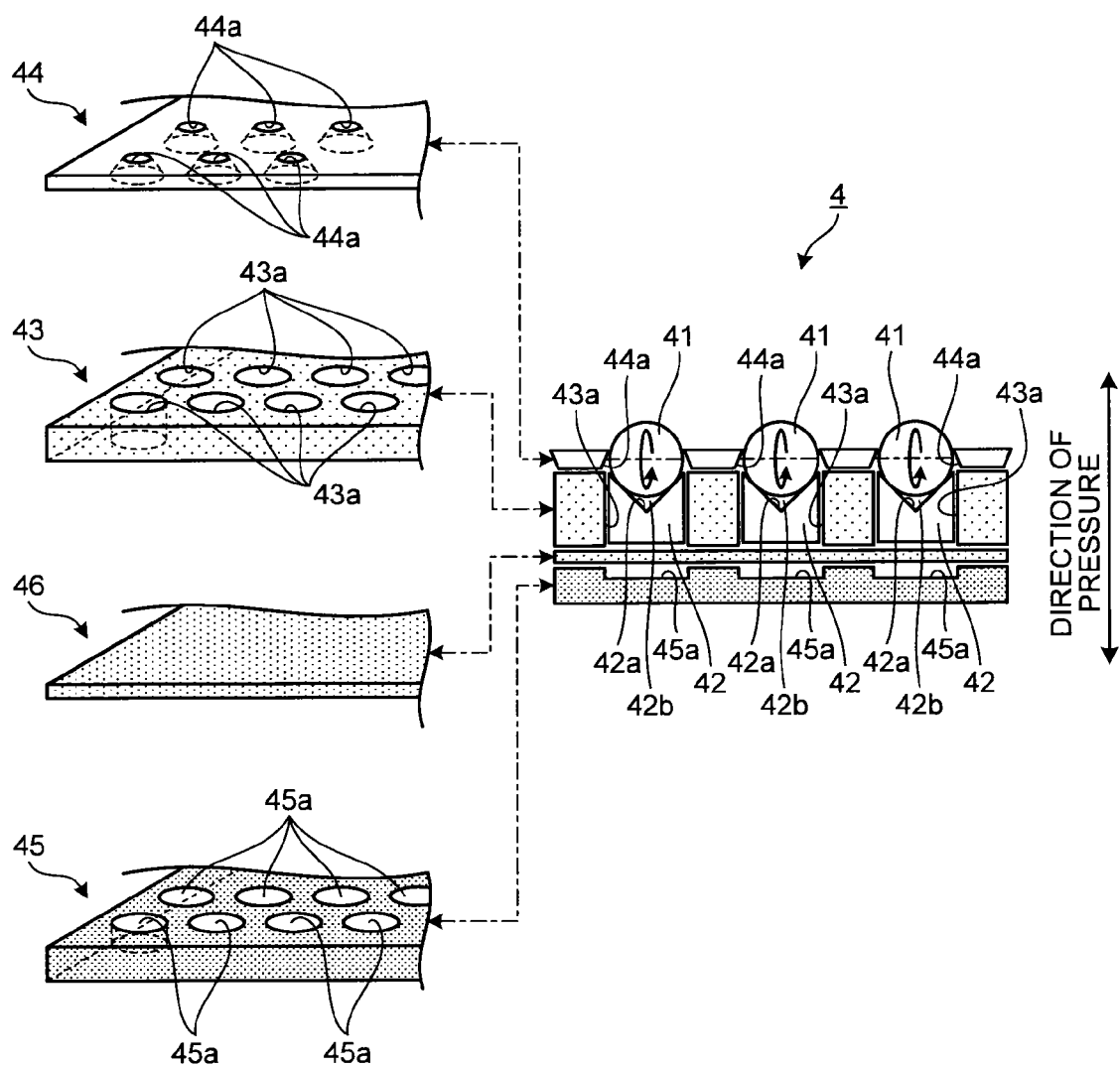
FIG. 3 is a schematic exploded perspective view illustrating the layer structure of a brake pad according to First Embodiment.
Figure 4:
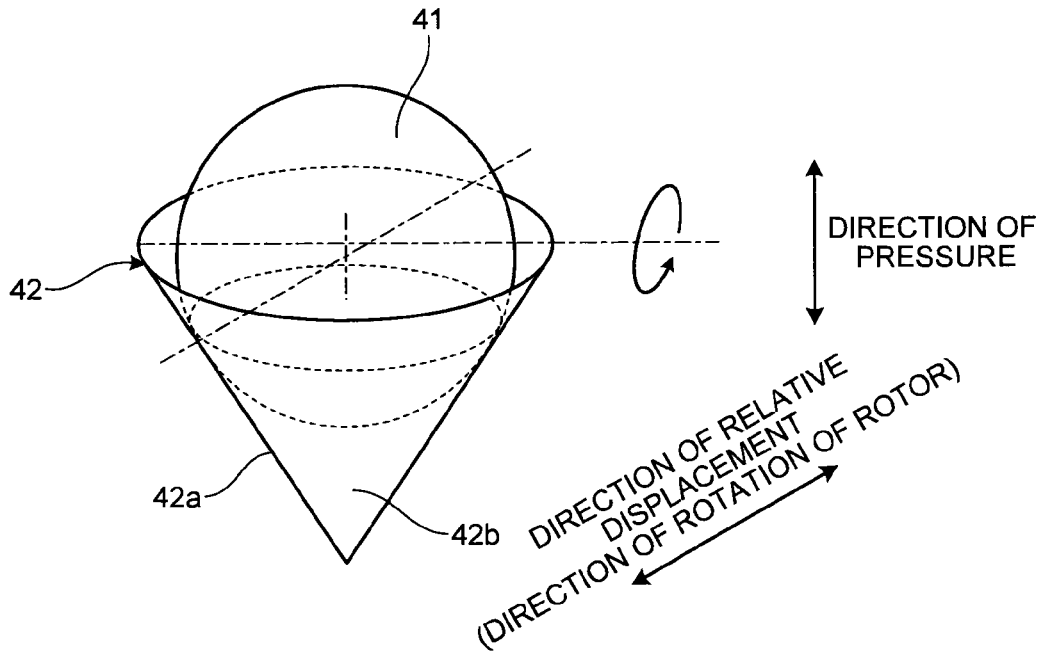
FIG. 4 is a perspective view schematically illustrating the surface shape of a contact wall surface of a holder and a corresponding rolling body, according to First Embodiment.
Figure 5:
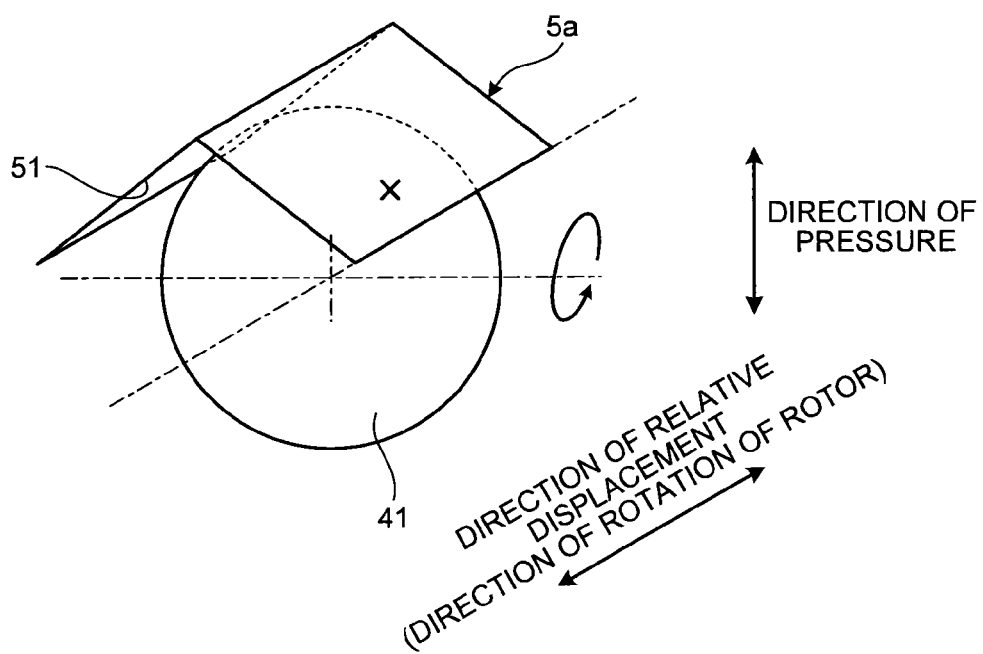
FIG. 5 is a perspective view schematically illustrating the surface shape of an abutting surface to each rolling body, according to First Embodiment.
Figure 6:
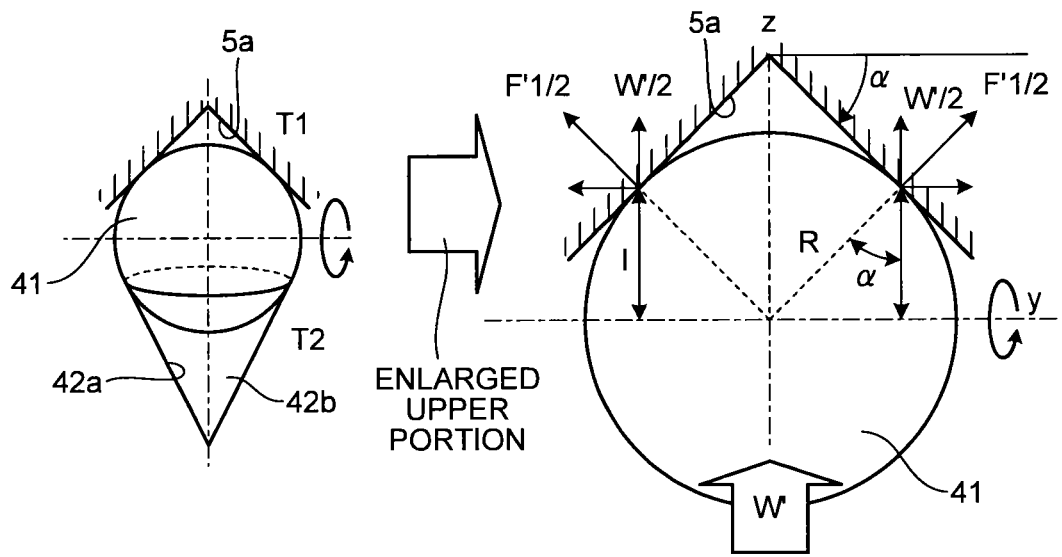
FIG. 6 is a schematic view explaining force acting between the disk rotor and each rolling body, according to First Embodiment.
Figure 7:
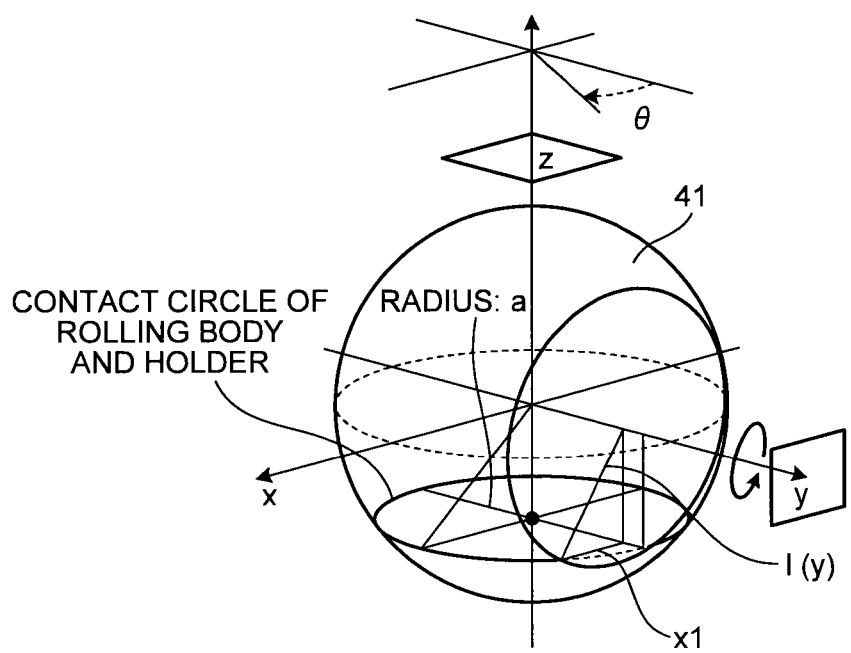
FIG. 7 is a schematic perspective view of the contact area between the each rolling body and the corresponding holder, according to First Embodiment.
Figure 8:
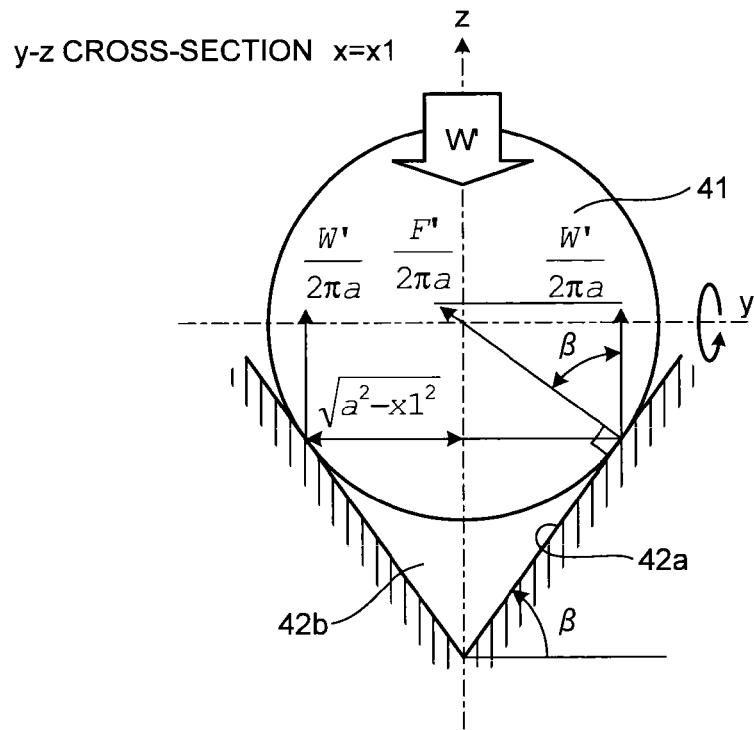
FIG. 8 is a schematic view explaining force acting between each holder and the corresponding rolling body, according to First Embodiment.
Figure 9:
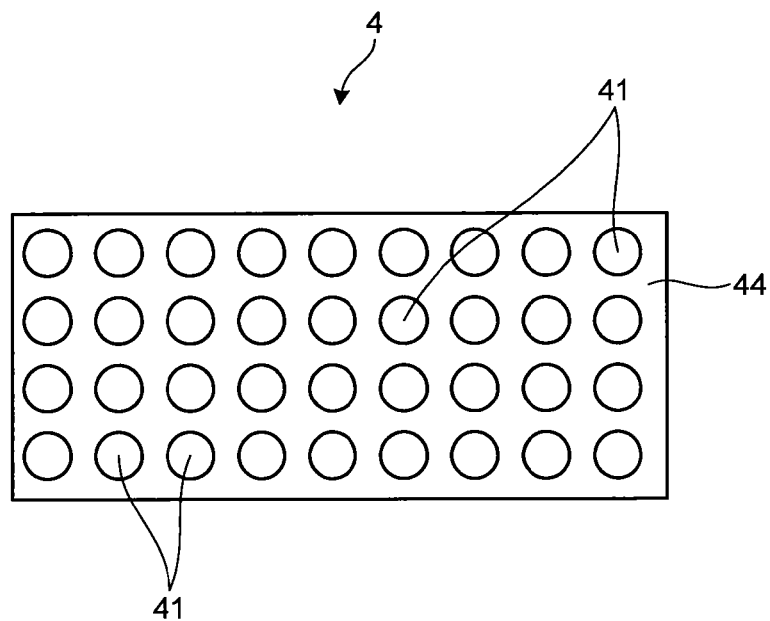
FIG. 9 is a front view of a surface of a brake pad, according to First Embodiment, pressed against the disk rotor.
Figure 10:
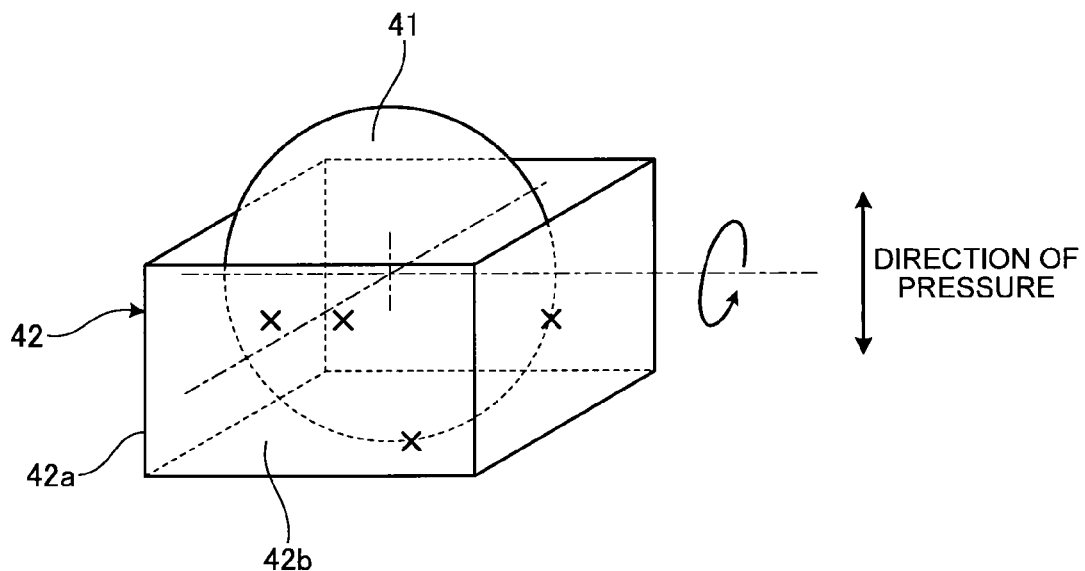
FIG. 10 is a perspective view schematically illustrating the shape of the surface of the contact wall of a holder and a corresponding rolling body, according to a modified example.
Figure 11:
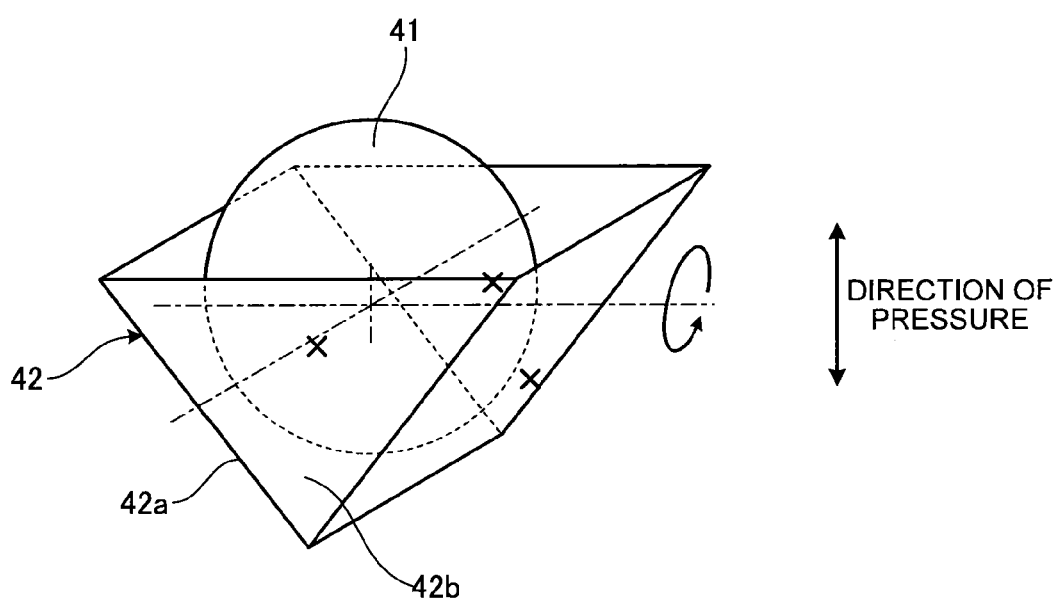
FIG. 11 is a perspective view schematically illustrating the shape of the surface of the contact wall of a holder and a corresponding rolling body, according to a modified example.
Figure 12:
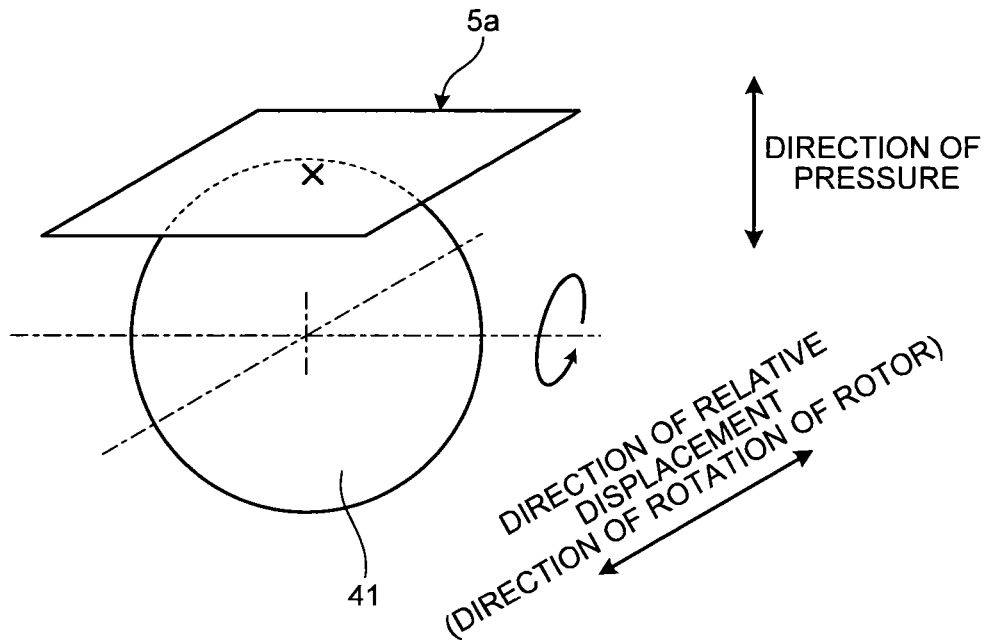
FIG. 12 is a perspective view schematically illustrating the shape of the surface of a disk rotor, according to a modified example, abutting on each rolling body.
Figure 13:
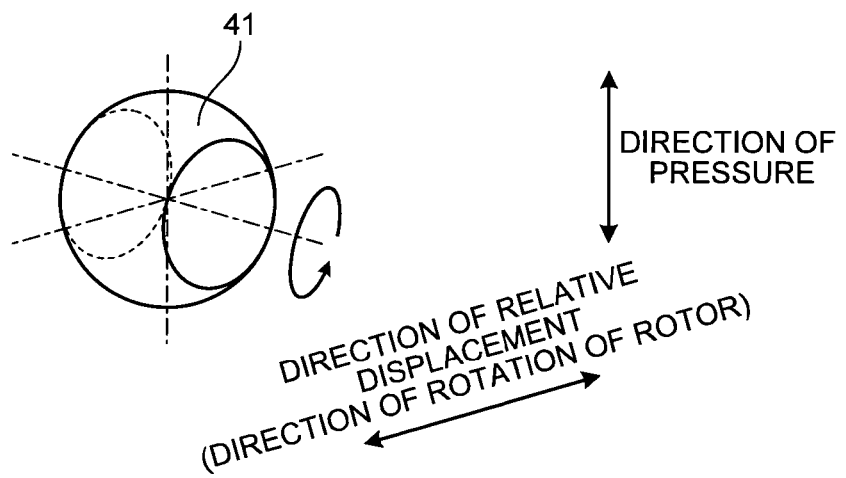
FIG. 13 is a perspective view schematically illustrating a rolling body according to a modified example.

FIG. 1 is a partial cross-sectional view schematically illustrating a friction couple for a brake device according to First Embodiment. FIG. 2 is a schematic cross-sectional view schematically illustrating the configuration of a brake device according to First Embodiment. FIG. 3 is a schematic exploded perspective view illustrating the layer structure of a brake pad according to First Embodiment. FIG. 4 is a perspective view schematically illustrating the surface shape of a contact wall surface of a holder and a corresponding rolling body, according to First Embodiment. FIG. 5 is a perspective view schematically illustrating the shape of the surface of a disk rotor, according to First Embodiment, abutting on each corresponding rolling body. FIG. 6 is a schematic view explaining force acting between the disk rotor, according to First Embodiment, and each rolling body. FIG. 7 is a schematic perspective view of the contact portion of each rolling body and the corresponding holder, according to First Embodiment. FIG. 8 is a schematic view explaining force acting between each holder and the corresponding rolling body, according to First Embodiment. FIG. 9 is a front view of a surface of a brake pad, according to First Embodiment, pressed against the disk rotor. Each of FIGS. 10 and 11 is a perspective view schematically illustrating the shape of the surface of the contact wall of a holder and a corresponding rolling body, according to a modified example. FIG. 12 is a perspective view schematically illustrating the shape of the surface of a disk rotor, according to a modified example, abutting on each rolling body. FIG. 13 is a perspective view schematically illustrating a rolling body according to a modified example.

Typically, a brake device 1 according to the present embodiment is mounted in a vehicle, as illustrated in FIGS. 1 and 2, and is provided to apply a braking force to a wheel supported by a vehicle body so as to be rotatable. The brake device 1 includes a friction couple 2 for the brake device, and an actuator 3 serving as a pressing mechanism.

The friction couple 2 for the brake device is to generate predetermined frictional force (frictional resistance) between frictional elements when braking force is applied to a wheel. The friction couple 2 for the brake device includes brake pads 4 serving together as a first member and a disk rotor 5 serving as a second member. The brake pads 4 are provided in a pair on the vehicle body side together with a wheel so as to be non-rotatable. The disk rotor 5 is provided on the wheel side so as to be rotatable integrally with the wheel. This allows a configuration in which the brake pads 4 and the disk rotor 5 are able to be displaced relative to each other, that is, which allows a relation in which the brake pads 4 are rotatable relative to the direction of rotation of the disk rotor 5. The pair of brake pads 4 are arranged on both sides of the disk rotor 5, one on each side, and located opposite a corresponding abutting faces 5a, which are both sides of the disk rotor 5. According to the operation of the actuator 3, the pair of brake pads 4 sandwich the disk rotor 5 from both sides of the disk rotor 5.

The actuator 3 is to press each brake pad 4 against the disk rotor 5 when driving force is applied to the wheel. The actuator 3 has a caliper 6 and a piston 7. The caliper 6 has a U shape across the disk rotor 5, and is supported by a bracket fixed on the vehicle side. The caliper 6 supports the pair of brake pads 4 such that the brake pads 4 can be brought into contact with the corresponding abutting faces 5*a* and separated therefrom. The caliper 6 includes: a cylinder portion 9 provided with a cylinder mechanism 8 that enables the piston 7 to be moved forward or backward; a reaction portion 10 disposed opposite the cylinder portion 9 with the disc rotor 5 between them; and a connection portion 11 connecting the cylinder portion 9 and the reaction portion 10. The pair of brake pads 4 are composed of an inner pad and an outer pad, which are disposed on the cylinder portion 9 side and the reaction portion 10 side, respectively, of the caliper 6. In the cylinder mechanism 8, the piston 7 is supported in the cylinder portion 9 so as to be freely moved, and a fluid pressure chamber 12 is defined by the cylinder portion 9, the piston 7, and a seal or the like. The leading end of the piston 7 is located opposite the brake pad (inner pad) 4.

Accordingly, when pressure is applied to the brake device 1 by supplying working fluid to the fluid pressure chamber 12 according to brake pedal depression performed by a driver, for example, the piston 7 moves forward in the direction of arrow A (i.e., in the direction in which the brake pad (inner pad) 4 comes nearer to the disk rotor 5), so that the leading end of the piston 7 presses the one brake pad 4, thereby making it possible to move the one brake pad 4 nearer to one abutting face 5*a* of the disk rotor 5. At this time, the caliper 6 moves forward in reverse direction to this piston 7 by virtue of the reaction force to the forward movement of the piston 7, namely, in the direction of arrow B (i.e., in the direction in which the brake pad (outer pad) 4 comes nearer to the disk rotor 5), thereby making it possible to move the other brake pad 4 nearer to the other abutting face 5*a* of the disk rotor 5. When each brake pad 4 is brought into contact with and pressed against the corresponding abutting face 5*a*, thereby sandwiching the disk rotor 5 between the brake pads 4, a predetermined rotation resistance acts on the disk rotor 5 rotating together with the wheel. Accordingly, the brake device 1 is able to apply braking force to the disk rotor 5 and the wheel rotating integrally with this. In the brake device 1, when pressure is removed from the fluid pressure chamber 12, the piston 7 and caliper 6 are returned to their respective predetermined positions such that each brake pad 4 separates from the disk rotor 5.

Incidentally, as illustrated in FIG. 1, the brake device 1 according to the present embodiment has holders 42 on the respective surfaces of the brake pads 4 composing the friction couple 2 for the brake device, which surfaces are pressed against the disk rotor 5. These holders 42 are in contact with corresponding rolling bodies 41 and hold these rolling bodies 41 such that the rolling bodies 41 are rotatable. This makes it possible appropriately to set performances such as frictional performance, and wear resistance performance regardless of, for example, the projecting area of the surface of each brake pad 4, which surface is pressed against the disk rotor 5. Here, the surface of each brake pad 4 pressed against the disk rotor 5 is the surface of the brake pad 4, which surface is opposite the abutting face 5*a* of the disk rotor 5.

In FIG. 1, the depth direction as viewed from the drawing is the direction of relative displacement of the each brake pad 4 and the disk rotor 5, that is, the direction of rotation of the disk rotor 5. In the brake pad 4, since inner and outer pads are substantially identical in configuration, it is assumed that they have a common configuration unless there is a necessity to distinguish between them in particular.

In this brake device 1, when each brake pad 4 is pressed against the rotating disk rotor 5, the rolling bodies 41 are rotated while being held by the corresponding holders 42. Thereby, by virtue of frictional force (frictional resistance) generated between the rolling bodies 41 and the holders 42 according to the rotation of the rolling bodies 41, braking force to brake the relative displacement of the brake pad 4 and the disk rotor 5, that is, rotation of the disk rotor 5, is generated. This brake device 1 is so structured that the rolling bodies 41 arranged on the surface of the corresponding brake bad 4, which surface is pressed against the disk rotor 5, are able to roll (rotate) in their places. The brake device 1 rotates the rolling bodies 41 by using the disk rotor 5 rotating together with the wheel, and also frictionally brakes these rotating rolling bodies 41 on the holders 42 side.

Specifically, the brake pad 4 includes, as illustrated in FIGS. 1 and 3, the rolling bodies 41, the holders 42, a guide plate 43, a separation-preventing device 44, a back metal 45 serving as a support member, an elastic member 46, and etc. The brake pad 4 has a layer structure in which the separation-preventing device 44, the holders 42, the guide plate 43, the elastic member 46, and the back metal 45 are arranged in that order from the surface that is pressed against the disk rotor 5 (the surface opposite the abutting face 5*a*). The rolling bodies 41 are held by the corresponding holders 42.

The rolling bodies 41 are able to rotate in the direction of relative displacement of the corresponding brake pad 4 and the disk rotor 5, that is, in the direction of rotation of the disk rotor 5. The rolling bodies 41 are arranged between the corresponding abutting face 5*a* of the disk rotor 5 and contact wall surfaces 42*a* of the corresponding holders 42 (described below). When the corresponding brake pad 4 is pressed against the disk rotor 5, the rolling bodies are brought into contact with the corresponding abutting face 5*a* and the corresponding contact wall surfaces 42*a*. Here, each rolling body 41 is a spherical body (spherical member).

As described above, each holder 42 is disposed in contact with the corresponding rolling body 41 and is provided to hold this rolling body 41 such that the rolling body 41 is rotatable in place. Specifically, the holder 42 holds the rolling body 41 such that the rolling body 41 is unable to be displaced relative to the holder 42 but is able to rotate (revolute) on its axis. The holder 42 holds the rolling body 41 such that the axis of rotation of the rolling body 41 is substantially orthogonal to the direction of rotation of the disk rotor 5 and the corresponding direction of pressure of the actuator 3. While each rolling body 41 is brought into contact with the brake pad 4 and the disk rotor 5 according to the relative displacement of the brake pad 4 and the disk rotor 5 (their rotation relative to one another), the rolling body 41 rotates around its own axis of rotation such that the rolling body 41 is kept in place by the holder 42 so as to prevent shifting of the axis of rotation.

In this case, the holder 42 is formed in a cylindrical shape according to the shape of the rolling body 41. In addition, the holder 42 has on the surface that is pressed against the disk rotor 5, specifically, on the surface that is brought into contact with the rolling body 41, a holding groove 42*b* for holding the rolling body 41. The contact wall surface 42*a* of the holding groove 42*b*, which the contact wall surface 42*a* is in contact with the rolling body 41, is inclined with respect to the direction of the axis of rotation of the rolling body 41 and the corresponding direction of pressure of the actuator 3. Accordingly, as described below, the brake device 1 is relatively able to increase frictional force between the rolling body 41 and the holder 42 according to, for example, the angle of the holding groove 42*b*, compared to a case where the surface of the holder 42, which surface is in contact with the rolling body 41, is flat. As a result, the braking force able to be generated can be relatively increased.

As illustrated in FIG. 4 also, each of the holding grooves 42*b* in the present embodiment is formed such that the contact wall surface 42*a* inclined as described above has a curved surface. Here, an explanation is given based on the assumption that the holding groove 42b has a conical shape. However, the holding groove 42b may be in the shape of a truncated cone. The bottom of the conical shape of the holding groove 42b is located on the side that is pressed against the disk rotor 5. The inside diameter of the bottom of the conical shape of the holding groove 42b is greater than the outside diameter of the rolling body 41. Part of the rolling body 41 is held by the inside of the holding groove 42b. Therefore, the contact portion of the holding groove 42b and the rolling body 41 forms a circular shape such that the contact wall surface 42a, which is the internal surface of the holding groove 42b, and the external surface of the rolling body 41 are in contact with each other (refer also to FIG. 7, which is described below).

The guide plate 43 is to position the holders 42 in specific positions. In this case, the brake pads 4 have a plurality of combinations of the rolling bodies 41 and the holders 42 holding them. That is, each brake pad 4 has the plurality of rolling bodies 41 and the plurality of holders 42. The guide plate 43 positions these holders 42 in specific corresponding positions.

The guide plate 43 is composed of a plate-like member and is provided with installation holes 43a formed through it in the corresponding direction of pressure of the actuator 3. The installation holes 43a are provided so as to correspond to the holders 42. The holders 42 are inserted and positioned in the corresponding installation holes 43a. Thus, the guide plate 43 is able to restrict the movements of the holders 42 so as to prevent the holders 42 from being moved relative to directions other than the corresponding direction of pressure of the actuator 3.

Additionally, the rolling bodies 41, the holders 42, and the guide plate 43 are sandwiched between the separation-preventing device 44 pressed against the disk rotor 5 and the back metal 45 on the opposite side to the separation-preventing device 44 (i.e., on the rear side of the brake pad 4) in the corresponding direction of pressure of the actuator 3, while the holders 42 are inserted in the corresponding installation holes 43a and hence the rolling bodies 41 are held in the corresponding holding grooves 42b. Thus, the rolling bodies 41, the holders 42, and the guide plate 43 are fixed in relative positional relation.

The separation-preventing device 44 is provided to prevent the rolling bodies 41 held in the corresponding holders 42 from falling off the holders 42. The separation-preventing device 44 is composed of a plate-like lid member and is provided with exposure openings 44a extending through the separation-preventing device 44 in the corresponding direction of pressure of the actuator 3. The exposure openings 44a are provided so as to correspond to the rolling bodies 41. While each rolling body 41 is held by the corresponding holder 42, part of the external surface of the rolling body 41 is exposed through the corresponding exposure opening 44a. Part of the external surface of each rolling body 41 is exposed on the opposite side to the corresponding holder 42 with the separation-preventing device 44 between the holder 42 and the part in the corresponding direction of pressure of the actuator 3. Thus, the separation-preventing device 44 is able to prevent the rolling bodies 41 from falling off the corresponding holders 42 and also bring the external surfaces of the rolling bodies 41, which external surfaces are exposed from the corresponding exposure openings 44a, into contact with the corresponding abutting face 5a of the disk rotor 5.

Each back metal 45 is a plate-like support member on which pressure from the actuator 3 acts, and serves as a base end portion for the corresponding brake pad 4. As illustrated in FIG. 2, also, the brake pads 4 are provided on the caliper 6 such that the back metal 45 abuts on the piston 7 and the reaction portion 10. The back metals 45 are provided to transmit pressure from the actuator 3 to all the holders 42.

In this case, the brake pad 4 in the present embodiment is provided with a distributing portion 47 on the rear side of the holders 42, that is, on the side opposite to the side pressed against the disk rotor 5. The distributing portion 47 is provided between the corresponding back metal 45 and the corresponding holders 42 in the corresponding direction of pressure of the actuator 3 and is used to distribute pressure applied by the actuator 3. The distributing portion 47 includes the elastic member 46.

The elastic member 46 is a sheet-like elastic body and is sandwiched between the guide plate 43 and the back metal 45 in the corresponding direction of pressure of the actuator 3. The elastic member 46 is composed of, for example, a sheet of rubber or a plate spring. The elastic member 46 is interposed between the back metal 45 and the holders 42. When pressure applied by the actuator 3 acts, the elastic member 46 is elastically deformed to distribute the pressure according to this deformation, thereby substantially evenly applying this pressure on the holders 42.

Where the elastic member 46 is, for example, a plate spring or the like, it is preferable to form the distributing portion 47 so as to include clearance parts 45a for the elastic member 46 according to the deformation, as illustrated in FIGS. 1 and 3. Thus, the distributing portion 47 can further improve effect in the distribution of pressure applied by the actuator 3. The clearance parts 45a are provided in the elastic member 46-side face of the back metal 45. The clearance parts 45a may be holes in the form of grooves provided in the back metal 45, or may be holes extending through the back metal 45. The clearance parts 45a are provided so as to correspond to the holders 42.

In each brake pad 4, while the relative positional relations among the rolling bodies 41, the holders 42, the guide plate 43, the separation-preventing device 44, the back metal 45, and the elastic member 46, which are composed as described above, are fixed, each exposure opening 44a, the corresponding rolling body 41, the corresponding holder 42 and the installation hole 43a, and the corresponding clearance part 45a are located opposite to one another in the corresponding direction of pressure of the actuator 3.

As illustrated in FIGS. 1 and 5, the disk rotor 5 is provided in contact with the rolling bodies 41, and rotates the rolling bodies 41 in the corresponding holders 42 according to the relative displacement of the corresponding brake pad 4 and the disk rotor 5. The disk rotor 5 has the form of a disk rotatable around the axis of rotation. The disk rotor 5 has accommodating grooves 51 in its portions with which the corresponding rolling bodies 41 are brought into contact, that is, in its abutting faces 5a. Each accommodating groove 51 is formed in the direction of the relative displacement of the corresponding brake pad 4 and the disk rotor 5, that is, along the direction of rotation of the disk rotor 5, and accommodates part of the corresponding rolling body 41. The accommodating groove 51 in this case has a V-shaped cross-sectional shape in the direction perpendicular to the direction of rotation of the disk rotor 5. The accommodating grooves 51 are provided in a plurality of places opposite the corresponding rolling bodies 41 in the corresponding direction of pressure of the actuator 3. Thus, the disk rotor 5 is able to guide rotation (roll) of the rolling bodies 41 according to the relative displacement of the corresponding brake pad and the disk rotor 5. Additionally, since parts of the rolling bodies 41 are accommodated in the accommodating grooves 51, the thickness of the friction couple 2 for the brake device can be reduced by the amounts in the direction of pressures.

The brake device 1 has the configuration described below, as a configuration in which the disk rotor 5 rotates the rolling bodies 41 in the corresponding holders 42 according to the relative displacement of the corresponding brake pad 4, which has the foregoing configuration, and the disk rotor 5, in other words, as a configuration in which the rolling bodies 41 are rotated by the disk rotor 5 when rotated together with a wheel and also the rolling bodies 41 are caused to generate friction on the holders 42 side. That is, each holder 42 and the disk rotor 5 are configured such that the force with which the rolling body 41 is rotated by the disk rotor 5 is greater than the force with which the rolling body 41 is held by the holder 42. The brake device 1 here realizes the foregoing configuration by its being set so that the relation among the coefficient μ1 of friction of the contact portion of the disk rotor 5 and the rolling body 41, the coefficient μ2 of friction of the contact portion of the holder 42 and the rolling body 41, and the angle β between the normal line of the contact wall surface 42a of the holder 42 in the contact portion of the holder 42 and the rolling body 41 and the corresponding direction of pressure of the actuator 3 satisfies a predetermined condition.

Now, referring to FIGS. 6, 7, and 8, a detailed description is given of a configuration in which the disk rotor 5 rotates the rolling bodies 41 in the holders 42 according to the relative displacement of the corresponding brake pad 4 and the disk rotor 5. In FIG. 7, the direction of the x axis corresponds to the direction of the relative displacement of each brake pad 4 and the disk rotor 5, that is, the rotating direction of the disk rotor 5; the direction of the y axis corresponds to the direction of the rotation axis of each rolling body 41; and the direction of the z axis corresponds to the corresponding direction of pressure of the actuator 3. FIG. 8 corresponds to a y-z cross-section where x=x1 in FIG. 7.

Also, in the following explanations of FIGS. 6, 7, and 8 and each mathematical expression described below, "F1" is frictional force between each rolling body 41 and the disk rotor 5; "F2" is frictional force between each rolling body 41 and the corresponding holder 42; "T1" is torque generated between each rolling body 41 and the disk rotor 5; "T2" is torque generated between each rolling body 41 and the corresponding holder 42; "μ1" is a coefficient of dynamic friction between each rolling body 41 and the disk rotor 5; "μ2" is a coefficient of dynamic friction between each rolling body 41 and the corresponding holder 42; "F'1" is the reaction forces of each rolling body 41 and the disk rotor 5 relative to each other; "F'2" is the reaction forces of each rolling body 41 and the corresponding holder 42 relative to each other; "W" is pressure applied to each brake pad 4 by the actuator 3; "W'" is pressure undergone by each rolling body 41; "l" is one arm's length of torque; "R" is the spherical radius of each rolling body 41; "α" is a half angle of a V-shaped groove of each accommodating groove; "β" is the angle of the conical top of each holding groove 42b; "a" is the radius of the contact circle between each rolling body 41 and the corresponding holder 42; and "N" is the number of the rolling bodies 41 in each brake pad 4. The angle α (0°<α<90°) corresponds to the angle formed between the normal line of each abutting face 5a in the contact portion of the disk rotor 5 and each rolling body 41 and the corresponding direction of pressure of the actuator 3 (refer to FIG. 6). The angle β (0°<β<90°) corresponds to the angle formed between the normal line of the contact wall surface 42a in the contact portion of each rolling body 41 in the corresponding holder 42 and the corresponding direction of pressure of the actuator 3 (refer to FIG. 8).

The frictional force F1 can be represented by F1=μ1·F'1. The frictional force F2 can be represented by F2=μ2·F'2. The torque T1 is torque corresponding to force with which each rolling body 41 is rotated by the disk rotor 5, namely, rotor-applied torque that is generated to rotate the rolling body 41 by use of the disk rotor 5 rotated together with the wheel. The torque T1 can be represented by T1=F1·l. The torque T2 is force with which each rolling body 41 is held by the corresponding holder 42. In other words, the torque T2 is torque corresponding to force with which the rotation of each rolling body 41 is stopped by the corresponding holder 42, namely, holder braking torque generated by each rolling body 41 rotated while held by the corresponding holder 42. The torque T2 can be represented by F2·∫l(z)dz.

In the brake device 1, the torque T1 acting on the contact portion of each rolling body 41 and the disk rotor 5 exceeds the torque T2 acting on the contact portion of each rolling body 41 and the corresponding holder 42, that is, T1>T2 is satisfied, whereby the disk rotor 5 is able to rotate each rolling body 41 in the corresponding holder 42 according to the relative displacement of the corresponding brake pad 4 and the disk rotor 5.

First, the reaction force F'1, frictional force F1, and arm length l can be represented by Mathematical Formula (1) given by Mathematical Expression 1 below (Refer to FIG. 6).

[Mathematical Expression 1]

$$F'1 = \frac{W'}{\cos(\alpha)}, F1 = \frac{\mu 1 W'}{\cos(\alpha)}, l = R\cos(\alpha) \quad (1)$$

Therefore, the torque T1 can be represented by Mathematical Formula (2) given by Mathematical Expression 2 below.

[Mathematical Expression 2]

$$T1 = F1l = \frac{\mu 1 W'}{\cos(\alpha)} R\cos(\alpha) \quad (2)$$
$$= \mu 1 W' R$$

On the other hand, the torque T2 can be represented by Mathematical Formula (3) given by Mathematical Expression 3 below (refer to FIGS. 7 and 8).

[Mathematical Expression 3]

$$T2 = 4 \int_0^a \int_0^{\pi/2} \mu 2 \frac{F'2}{2\pi a} l(y) d\theta dy \quad (3)$$

Here, substituting $l^2(y)=R^2-y^2$, that is, $l(y)=\sqrt{(R^2-y^2)}$ into the Mathematical Formula (3) makes it possible to transform this Mathematical Formula (3) into Mathematical Formula (4) given by Mathematical Expression 4.

[Mathematical Expression 4]

$$T2 = 4 \int_0^a \int_0^{\pi/2} \mu 2 \frac{F'2}{2\pi a} \sqrt{R^2 - y^2} \, d\theta dy \quad (4)$$
$$= \mu 2 \frac{F2}{a} \int_0^a \sqrt{R^2 - y^2} \, dy = \frac{\mu 2 F2 R}{a} \int_0^a \sqrt{1 - (1/R^2)y^2} \, dy$$

Additionally, if $(1/R) \cdot y = \cos(t)$, $y \to 0$; $t \to \pi/2$, $y \to a = \sin(\beta)$; and $t \to \cos^{-1}(\sin \beta)$. Accordingly, the Mathematical Formula (4) can be transformed into Mathematical Formula (5) given by Mathematical Expression 5.

[Mathematical Expression 5]

$$
\begin{aligned}
T2 &= \frac{\mu 2 F' 2R}{a} \int_{\pi/2}^{\cos^{-1}(\sin\beta)} \sqrt{1 - \cos^2(t)} \cdot (-R\sin t) \, dt \quad (5) \\
&= -\frac{\mu 2 F' 2R^2}{a} \int_{\pi/2}^{\cos^{-1}(\sin\beta)} \sin^2 t \, dt \\
&= -\frac{\mu 2 F' 2R^2}{a} \int_{\pi/2}^{\cos^{-1}(\sin\beta)} \frac{1 - \cos 2\theta}{2} \, dt \\
&= -\frac{\mu 2 F' 2R^2}{a} [(1/2)t - (1/4)\sin 2t]_{\pi/2}^{\cos^{-1}(\sin\beta)} \\
&= -\frac{\mu 2 F' 2R^2}{a} [(1/2)\cos^{-1}(\sin\beta) - \pi/4 - (1/4)\sin\{2\cos^{-1}(\sin\beta)\}] \\
&= -\frac{\mu 2 F' 2R^2}{4a} [2\cos^{-1}(\sin\beta) - \pi - \sin\{2\cos^{-1}(\sin\beta)\}] \\
&= -\frac{\mu 2 F' 2R^2}{4a} [(\pi - 2\beta) - \pi - \sin(\pi - 2\beta)] \\
&= \frac{\mu 2 F' 2R^2}{4a} [2\beta + \sin(\pi - 2\beta)] \\
&= \mu 2 \frac{W'/\cos\alpha}{4R\sin\beta} R^2 (2\beta + \sin 2\beta) = \frac{\mu 2 W' R}{2\sin 2\beta} (2\beta + \sin 2\beta) \\
&= \frac{\mu 2 W' R}{2} \left( \frac{2\beta}{\sin 2\beta} + 1 \right)
\end{aligned}
$$

In addition, conditions required for the disk rotor 5 to rotate each rolling body 41 in the corresponding holder 42 according to the relative displacement of the corresponding brake pad 4 and the disk rotor 5 satisfy T1>T2, as described above. Therefore, by substituting the Mathematical Formulae (2) and (5) into a conditional formula for this, the conditional formula can be expressed by Mathematical Formula (6) given by Mathematical Expression 6 below.

[Mathematical Expression 6]

$$\mu 1 W' R > \frac{\mu 2 W' R}{2} \left( \frac{2\beta}{\sin 2\beta} + 1 \right) \quad (6)$$

Then, by removing W' and R from both sides of this Mathematical Formula (6), a conditional formula expressed by Mathematical Formula (7) given by Mathematical Expression 7 can be obtained.

[Mathematical Expression 7]

$$\mu 1 > \frac{\mu 2}{2} \left( \frac{2\beta}{\sin 2\beta} + 1 \right) \quad (7)$$

In the brake device 1, the shape of the holding groove 42b of each of the holders 42, a friction coefficient for the external surface of each of the rolling bodies 41, a friction coefficient for the contact wall surface 42a of each of the holders 42, a friction coefficient for each of the abutting faces 5a of the disk rotor 5, etc., are set so that the relation among the friction coefficient μ1, friction coefficient μ2, and angle β satisfies the conditional formula given by the Mathematical Formula (7). That is, each of the holders 42 and the disk rotor 5 are shaped so that the relation among the friction coefficient μ1, friction coefficient μ2, and angle β satisfies the Mathematical Formula (7). Accordingly, setting the relation among the friction coefficient μ1, friction coefficient μ2, and angle β so as to satisfy the condition expressed by the Mathematical Formula (7) allows the brake device 1 to realize a configuration in which the torque T1 exceeds the torque T2, that is, a configuration for rotating rolling bodies 41 by use of the disk rotor 5 rotating together with a wheel and for causing friction on each rolling body 41 on the corresponding holder 42 side.

In the brake device 1 with the foregoing configuration, when the brake pads 4 are pressed against the rotating disk rotor 5, rotation of the disk rotor 5 is transmitted to the rolling bodies 41, so that the rolling bodies 41 are rotated (rolled) in the corresponding holders 42. That is, the brake device 1 is able to roll the rolling bodies 41 by use of the disk rotor 5, thereby causing friction on the rolling bodies 41 on the holder 42 sides of the corresponding brake pads 4. In the brake device 1, the rolling bodies 41 are rotated while held by the corresponding holders 42; and, by virtue of frictional force (frictional resistance) generated between the rolling bodies 41 and the corresponding holders 42 according to rotation of the rolling bodies 41, braking force for braking the rotation of the disk rotor 5 can be generated. While the brake pad 4 and the disk rotor 5 are pressed against each other, the brake device 1 is able to brake the relative displacement by virtue of frictional force generated between the rolling bodies 41 and the corresponding holders 42 when the disk rotor 5 rolls the rolling bodies 41 according to the relative displacement of each brake pad 4 and the disk rotor 5. As a result, the brake device 1 is able to apply specific braking force to the disk rotor 5 and hence the wheel.

At this time, braking force f generated by the brake device 1 can be expressed by Mathematical Formula (8) given by Mathematical Expression 8.

[Mathematical Expression 8]

$$
\begin{aligned}
f &= \frac{\mu 2 W' R}{2} \left( \frac{2\beta}{\sin 2\beta} + 1 \right) \cdot N \cdot \frac{1}{R} = \quad (8) \\
&\frac{\mu 2 (W/N) N}{2} \left( \frac{2\beta}{\sin 2\beta} + 1 \right) = \frac{\mu 2 W}{2} \left( \frac{2\beta}{\sin 2\beta} + 1 \right)
\end{aligned}
$$

Where the contact wall surface 42a is inclined according to angle β as in the present embodiment, the brake device 1 is able to generate braking force f that is approximately (1/2)·[(2β/sin 2β)+1] times greater than braking force (=μ2·W) obtained where the contact surface between each holder 42 and the corresponding rolling body 41 is flat. For example, in the case of β=30°, β=45°, and β=60°, the brake device 1 is able to generate braking force f that is approximately 1.1 times, 1.29 times, and 1.7 times, respectively, greater than braking force obtained where the contact surface between each holder 42 and the corresponding rolling body 41 is flat. Accordingly, braking performance can be relatively improved.

As a result, the brake device 1 is able to preferably set performance, such as friction performance and wear resistance performance, regardless of, for example, the projecting area of the surface of each brake pad 4, which surface is pressed against the disk rotor 5. Specifically, by appropriately setting the number of rolling bodies 41, the shape of the holding groove 42b of each holder 42, a friction coefficient for the external surface of each rolling body 41, a friction coefficient for the contact wall surface 42a of each holder 42, and a friction coefficient for each abutting surface 5a of the disk rotor 5, the brake device 1 is able to modify performance, such as friction performance and wear resistance performance, regardless of the projecting area of each brake pad 4 on the holder 42 side. These performances make it possible to realize the brake device 1, the friction couple 2 for the brake device, and the brake pads 4, all of which do not depend on the respective projecting areas of the brake pads 4 on the corresponding holder 42 sides.

For example, the brake device 1 has a configuration in which rotation of the disk rotor 5 is braked by frictional force generated between the rolling bodies 41 and the corresponding holders 42 when the disk rotor 5 rolls the rolling bodies 41. Therefore, the area of the entire external surface of each rolling body 41 can be regarded as the wear area of the corresponding brake pad 4, as illustrated in FIG. 9 by example. Consequently, the brake device 1 is able to make the wear area larger than the holder 42 side projecting area of the brake pad 4, thus improving wear resistance performance.

In the brake pad 4 illustrated in FIG. 9 by example, the dimensions of each long side and each short side of the surface pressed against the disk rotor 5 are 100 mm and 57.2 mm respectively. In this surface, a total of 36 rolling bodies 41 are arranged in four columns and nine rows. Each rolling body 41 is set to 4.5 mm in radius and 7.15 mm in distance between the centers of adjacent rolling bodies 41. In a conventional brake pad, where the dimensions of the surface pressed against the disk rotor 5 are assumed to be the same as those of the brake pad 4 illustrated in FIG. 9, wear area A1 is as follows: $A1=100\times57.2=5720$ mm$^2$. Compared to this, in the brake pad 4, wear area A2 is as follows: $A2=(4/3)\times\pi\times(4.5)^3\times36=13741$ mm$^2$. Accordingly, the brake pad 4 yields the advantageous effect in which a wear area is $A2/A1\approx2.4$ times greater than that of a conventional brake pad.

Also, the brake device 1 has a configuration in which rotation of the disk rotor 5 is braked by virtue of frictional force generated between the rolling bodies 41 and the corresponding holders 42 when the disk rotor 5 rolls the rolling bodies 41. Thereby, for example, loads at friction contact points can be stabilized, compared to the case where rotation of the disk rotor 5 is braked by virtue of friction between flat surfaces; hence friction performance can be improved. Additionally, in this brake device 1, when pressure is applied to the back metal 45 by the actuator 3, this pressure is distributed by the distributing portion 47 and applied to the holders 42 substantially evenly. Accordingly, load at each friction contact point can be further stabilized and hence friction performance can be further improved. Also, by virtue of this, the brake device 1 can render wear of each rolling body 41 more uniform.

The brake device 1 according to the embodiment described above includes: the brake pads 4 having the holders 42 provided in contact with the corresponding rolling bodies 41 and holding these rolling bodies 41 such that the rolling bodies 41 are rotatable; the disk rotor 5 provided in contact with the rolling bodies 41 and rotates the rolling bodies 41 in the corresponding holders 42 according to the relative displacement of each brake pad 4 and this disk rotor 5; and the actuator 3 that presses each brake pad 4 and the disk rotor 5 against each other. The friction couple 2 for the brake device, according to the embodiment described above, includes: the brake pads 4 having the holders 42 provided in contact with the corresponding rolling bodies 41 and holding these rolling bodies 41 such that the rolling bodies 41 are rotatable; the disk rotor 5 provided in contact with the rolling bodies 41 that rotates the rolling bodies 41 in the corresponding holders 42 according to the relative displacement of each brake pad 4 and the disk rotor 5. Each brake pad 4 according to the embodiment described above has on the surface that is pressed against the disk rotor rotating together with the wheel the holders 42 provided in contact with the corresponding rolling bodies 41 and holding the rolling bodies 41 such that the rolling bodies 41 are rotatable. Accordingly, the brake device 1, the friction couple 2 for the brake device, and the brake pads 4 allow preferable performance settings regardless of, for example, the projecting areas of the surfaces of the brake pads 4 pressed against the disk rotor 5.

The description of the foregoing brake device 1 was given based on the assumption that each holding groove 42b has the shape of a cone. However, the invention is not limited to this, and the holding grooves 42b may have the shape of a rectangular parallelepiped or cube, as illustrated in FIG. 10, or may have the shape of a triangular prism as illustrated in FIG. 11.

Also, the description of the foregoing brake device 1 was given based on the assumption that each holder 42 has the holding groove 42b. However, the holding surface may be flat. In this case, by appropriately setting a coefficient of friction for between each rolling body 41 and the disk rotor 5 and a coefficient of friction for between each rolling body 41 and the corresponding holder 42, the brake device 1 may realize a configuration in which torque T1 exceeds torque T2; to be specific, a configuration in which the rolling bodies 41 are rotated by the disk rotor 5 rotating together with the wheel and also friction of each rolling body 41 is caused on the corresponding holder 42 side.

Also, the description of the foregoing brake device 1 was given based on the assumption that the disk rotor 5 has the accommodating grooves 51 on its abutting faces 5a. However, the invention is not limited to this, and the abutting faces 5a may be flat, as illustrated in FIG. 12.

Also, the description of the foregoing brake device 1 was given on the assumption that the rolling bodies 41 are spherical. However, the invention is not limited to this. As illustrated in FIG. 13, each rolling body 41 may have the shape of a barrel or spindle or of a cylindrical roller, as long as the rolling body 41 is rotatable in the direction of relative displacement of the corresponding brake bad 4 and the disk rotor 5, that is, the direction of rotation of the disk rotor 5.

Additionally, the brake device 1 described above may have a configuration that includes neither the elastic members 46 nor the distributing portions 47. Where each elastic member 46 is provided as a sheet-like member, the corresponding distributing portion 47 is able to obtain adequate pressure distribution effect without having the clearance parts 45a.

Second Embodiment

Figure 14:
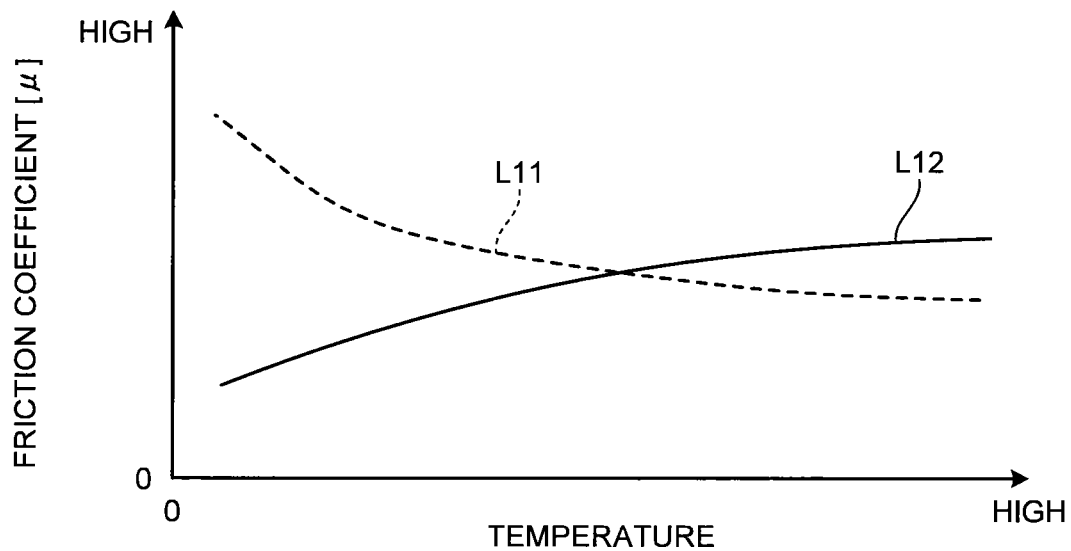
FIG. 14 is a diagram illustrating the relation between the temperature and friction coefficient of the brake device according to Second Embodiment.
Figure 15:
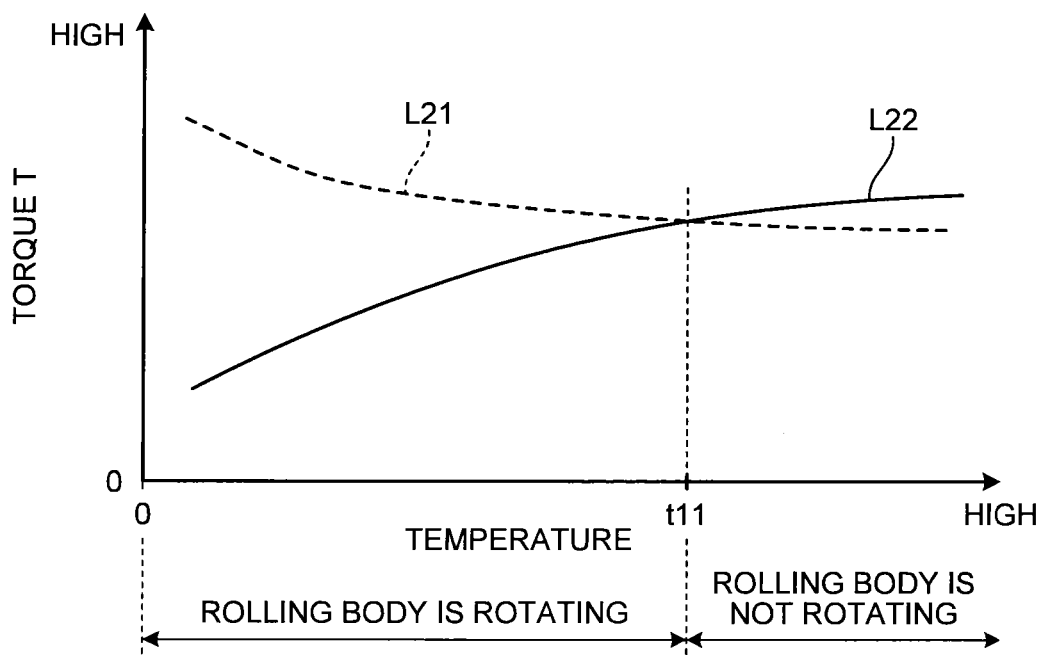
FIG. 15 is a diagram illustrating the relation between temperature and torque in the brake device according to Second Embodiment.

FIG. 14 is a diagram illustrating the relation between the temperature and friction coefficients of the brake device according to Second Embodiment. FIG. 15 is a diagram illustrating the relation between temperature and torque in the brake device according to Second Embodiment. The brake device, the friction couple for the brake device, and the brake pad, according to Second Embodiment, differ from First Embodiment in that the magnitude relation between torques T1 and T2 reverses according to situation. Also, duplicate explanations of configuration, operation, and effect shared with the foregoing Embodiment are minimized and components or the like identical to those in First Embodiment are labeled with the same symbols as those in First Embodiment. As for a principal configuration, the drawings explained in First Embodiment are referred to, as necessity requires (this is the same for the subsequent embodiment as well).

A brake device 201, a friction couple 202 for the brake device, and a brake pad 204, according to the present embodiment (to be explained in FIGS. 14 and 15), have a configuration in which the magnitude relation between the force with which each rolling body 41 is rotated by the disk rotor 5 and the force with which each rolling body 41 held by the corresponding holder 42 reverses according to any temperature increase of the holder 42 or the corresponding rolling body 41. As described above, the force with which each rolling body 41 is rotated by the disk rotor 5 corresponds to the torque T1, and the force with which each rolling body 41 is held by the corresponding holder 42 corresponds to the torque T2. That is, each holder 42 and the disk rotor 5 in the present embodiment have a configuration in which the magnitude relation between torques T1 and T2 reverses.

The holders 42 and the disk rotor 5 in the present embodiment realize a configuration in which the magnitude relation between torques T1 and T2 reverses when the friction coefficient for the contact wall surface 42a of each holder 42 and the friction coefficient for each abutting force 5a of the disk rotor 5 change according to any increase in the temperature of the holder 42 or the corresponding rolling body 41.

The disk rotor 5 is configured such that the friction coefficient for the contact portion of this disk rotor 5 and each rolling body 41 decreases according to any temperature increase of each holder 42 or the corresponding rolling body 41, as indicated by the dotted line L11 in FIG. 14. The entire disk rotor 5 may be made of a material the friction coefficient for which decreases according to any temperature increase, or else each abutting face 5a may be provided with a surface treatment that decreases the friction coefficient according to any temperature increase. Each holder 42 is configured such that the friction coefficient for the contact portion of each holder 42 and the corresponding rolling body 41 increases according to any temperature increase of the holder 42 or the corresponding rolling body 41, as indicated by the solid line L12 in FIG. 14. The holder 42 may be entirely made of a material that increases in friction coefficient according to any temperature increase or else the contact wall surface 42a may be provided with a surface treatment that increases in friction coefficient according to any temperature increase.

In the brake device 201 with the foregoing configuration, when each rolling body 41 is rolled by the disk rotor 5 and friction of the rolling body 41 is caused on the holder 42 side of the corresponding brake pad 4, the temperatures of the holder 42 and the corresponding rolling body 41 increase by virtue of the heat caused by friction. Consequently, as the temperatures of the holder 42 and the rolling body 41 increase, the friction coefficient for the contact portion of the disk rotor 5 and the rolling body 41 decreases as indicated by the dotted line L11 in FIG. 14 whereas the friction coefficient for the contact portion of the holder 42 and the rolling body 41 increases as indicated by the solid line L12 in FIG. 14. Additionally, in the brake device 201, as the temperature increases, that is, as the friction coefficient for the contact portion of the disk rotor 5 and the rolling body 41 decreases, the torque T1 decreases as indicated by the dotted line L21 in FIG. 15. Also, in the brake device 201, as the temperature increases, that is, as the friction coefficient for the contact portion of the holder 42 and the rolling body 41 increases, the torque T2 increases as indicated by the solid line L22 in FIG. 15. Thus, the brake device 201 is able to reverse the magnitude relation of the torques T1 and T2.

As a result, when the temperatures of each holder 42 and the corresponding rolling body 41 of the brake device 201 reach predetermined temperature t11, the torque T1 becomes less than torque T2, that is, T1 ≤ T2. Consequently, in the brake device 201, the rotation of each rolling body 41 stops and the friction of the rolling body 41 on the holder 42 side stops, and friction on the rolling body 41 is caused on the disk rotor 5 side. Specifically, in the brake device 201, when the temperatures of each holder 42 and the corresponding rolling body 41 reach or exceed a predetermined temperature, rotation of the rolling body 41 in the holder 42 stops, with the result that, by virtue of frictional force (frictional resistance) caused between the disk rotor 5 and the rolling body 41 according to rotation of the disk rotor 5, braking force to brake rotation of the disk rotor 5 is generated. At this time, since rotation of the rolling body 41 in the corresponding holder 42 stops and thus friction between the rolling body 41 and the holder 42 stops, the brake device 201 is able to restrain transfer of frictional heat toward the holder 42, and hence restrain temperature increase on the brake pad 204 side. Accordingly, the brake device 201 is reliably able to prevent occurrence of so-called vapor lock phenomenon.

In the brake device 201, the friction couple 202 for the brake device, and the brake pad 204, according to the embodiment described above, the holders 42 and the disk rotor 5 have a configuration in which the magnitude relation between the force with which each rolling body 41 is rotated by the disk rotor 5 and the force with which the rolling body 41 is held by the corresponding holder 42 reverses according to temperature increase of the holder 42 or the rolling body 41. Accordingly, the brake device 201, the friction couple 202 for the brake device, and the brake pad 204, are able to restrain temperature increase on the corresponding brake pad 204 side.

The foregoing description was given based on the assumption that both the friction coefficient for the contact wall surface 42a of each holder 42 and the friction coefficient for each abutting face 5a of the disk rotor 5 change according to temperature increase of the holder 42 or the rolling body 41. However, the present invention is not limited to this and either one of them may change.

Third Embodiment

Figure 16:
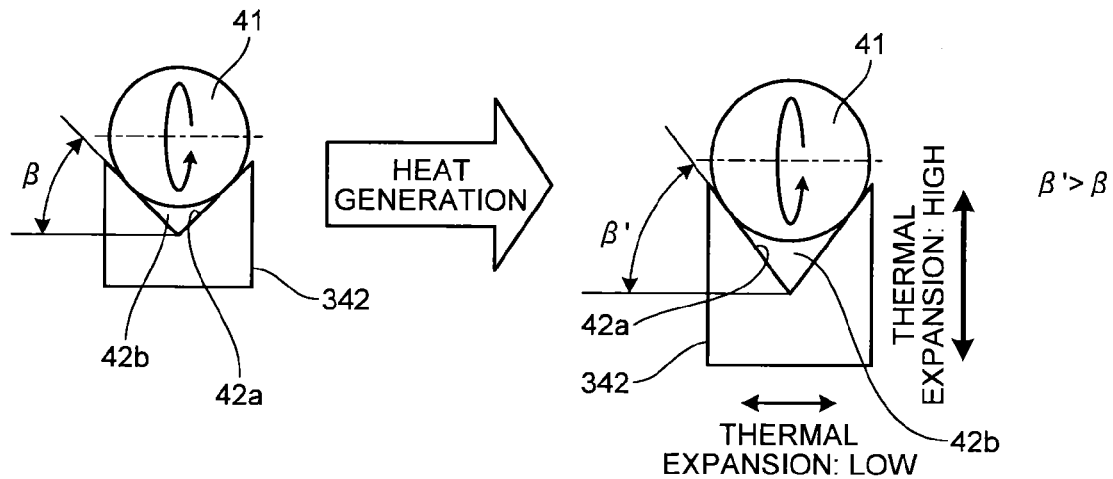
FIG. 16 is a schematic view explaining the holders of a brake device according to Third Embodiment.
Figure 17:
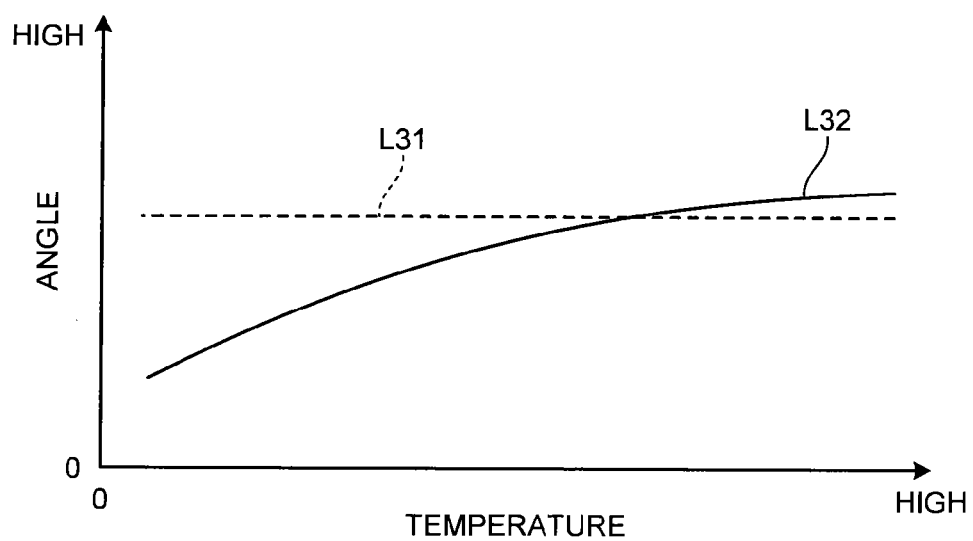
FIG. 17 is a diagram illustrating the relation between the temperature and angle of the brake device according to Third Embodiment.
Figure 18:
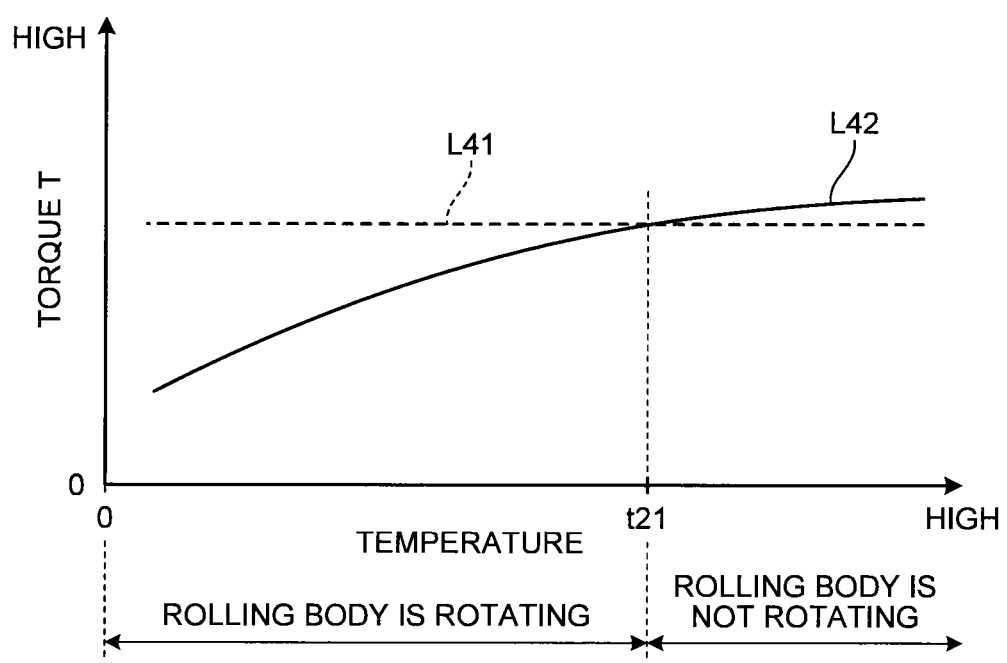
FIG. 18 is a diagram illustrating the relation between temperature and torque of the brake device according to Third Embodiment.

FIG. 16 is a schematic view explaining the holders of a brake device according to Third Embodiment, FIG. 17 is a diagram illustrating the relation between the temperature and angle of the brake device according to Third Embodiment, and FIG. 18 is a diagram illustrating the relation between temperature and torque of the brake device according to Third Embodiment. The brake device, friction couple for the brake device, and the brake pad, according to Third Embodiment, differ from Second Embodiment in the configuration for reversing the magnitude relation between the torque T1 and torque T2.

A brake device 301, a friction couple 302 for the brake device, and brake pads 304, according to the present embodiment explained with reference to FIGS. 16, 17, and 18, have holders 342 in place of the holders 42. Each holder 342 in the present embodiment realizes a configuration in which the angle β formed between the normal line of the contact wall surface 42a of the contact portion of the corresponding rolling body 41 and the direction of pressure of the actuator 3 increases according to any temperature increase of the holder 342 or the rolling body 41, thereby reversing the magnitude relation between the torques T1 and T2.

Each holder 342 has a structure in which the angle β increases by utilizing, for example, thermal expansion of the holder 342 itself, as illustrated in FIG. 16. The holder 342 is made of a material whose coefficient of linear expansion differs according to direction, that is, an isotropic material, such as a composite. In this case, the holder 342 is configured so that while thermal expansion in the direction of the axis of rotation of the rolling body 41 relatively decreases, thermal expansion in the direction of pressure of the actuator relatively increases.

In the brake device 301 with the foregoing configuration, as the temperatures of the each holder 342 and the corresponding rolling bodies 41 increase, the angle α on the corresponding abutting face 5a side remains substantially constant, as indicated by a solid line L31 in FIG. 17; in contrast, the angle β of the holder 342 increases (see angle β' in FIG. 16), as indicated by the solid line L32 in FIG. 17. Also, in the brake device 301, the torque T1 is constant as indicated by the dotted line L41 in FIG. 18; in contrast, as indicated by the solid line L42, the torque T2 increases as the temperatures rise, that is, as the angle β of the holder 342 increases. Thus, the brake device 301 is able to reverse the magnitude relation between the torques T1 and T2.

As a result, when the temperatures of each holder 342 and the corresponding rolling body 41 of the brake device 301 reach predetermined temperature t21, the torque T1 becomes less than torque T2, that is, T1≤T2. Consequently, friction on the rolling body 41 on the holder 342 side stops, and friction on the rolling body 41 occurs on the disk rotor 5 side.

In the brake device 301, the friction couple 302 for the brake device, and the brake pad 304, according to the embodiment described above, the holders 342 and the disk rotor 5 have the configuration in which the magnitude relation between the force with which each rolling body 41 is rotated by the disk rotor 5 and the force with which the rolling body 41 is held by the corresponding holder 342 reverses according to temperature increase of the holder 342 or the rolling body 41. Accordingly, the brake device 301, the friction couple 302 for the brake device, and the brake pad 304 are able to restrain temperature increase on the corresponding brake pad 304 side.

It is to be understood that the brake devices, friction couples for the brake devices, and the brake pads, according to the foregoing embodiments of the present invention, are not limited to those embodiments, and various modifications may be made to them within the scope described in the claims.

The descriptions above were given based on the assumption that the brake pads 4 are a first member and the disk rotor 5 is the second member. However, the invention is not limited to these, and the disk rotor and the brake pads may be the first member and second member respectively; that is, a configuration in which the rolling bodies may be held by holders provided on the disk rotor side. In this case, each rolling body is rolled by the corresponding brake pad according to the relative displacement of the brake pad and disk rotor, and braking force can be applied to the wheel by frictional resistance between the holders and rolling bodies of the disk rotor.

INDUSTRIAL APPLICABILITY

As described above, the brake devices, friction couples for the brake devices, and brake pads, according to the present invention, are preferable for use variously as brake devices, or as friction couples and brake pads for brake devices, which are used in vehicles.

REFERENCE SINGS LIST 1, 201, 301 BRAKE DEVICE
2, 202, 302 FRICTION COUPLE FOR BRAKE DEVICE
3 ACTUATOR (PRESSING MECHANISM)
4, 204, 304 BRAKE PAD (FIRST MEMBER)
5 DISK ROTOR (SECOND MEMBER)
5a ABUTTING FACE
41 ROLLING BODY
42, 342 HOLDER
42a CONTACT WALL SURFACE
42b HOLDING GROOVE
45 BACK METAL (SUPPORT MEMBER)
46 ELASTIC MEMBER
47 DISTRIBUTING PORTION
51 ACCOMMODATING GROOVE

The invention claimed is:

1. A brake device, comprising:
   a brake pad having at least one holder, each of the holder configured to be in contact with a corresponding rolling body and hold the rolling body rotatably;
   a disk rotor provided in contact with the rolling body and configured to rotate the rolling body in the holder according to a relative displacement with the brake pad; and
   a pressing mechanism configured to press the brake pad and the disk rotor against each other, wherein
   the rolling body is spherical,
   the holder has a holding groove configured to hold the rolling body,
   the holding groove has a shape of a cone or truncated cone, and
   while the brake pad and the disk rotor are pressed against each other, the relative displacement of the brake pad and disk rotor is braked by frictional force generated between the rolling body and the holder when the disk rotor rotates the rolling body according to the relative displacement.

2. The brake device according to claim 1, wherein the brake pad is not rotatable together with a wheel, and the disk rotor is rotatable together with the wheel.

3. The brake device according to claim 1, wherein the holder and the disk rotor are configured such that force with which the rolling body is rotated by the disk rotor is greater than force with which the rolling body is held by the holder.

4. The brake device according to claim 3, wherein the holder and the disk rotor are configured such that magnitude relation between the force with which the rolling body is rotated by the disk rotor and the force with which the rolling body is rotated by the holder reverses according to temperature increase of the holder or the rolling body.

5. The brake device according to claim 1, wherein a friction coefficient of the contact portion of the holder and the rolling body increases according to temperature increase of the holder or the rolling body.

6. The brake device according to claim 1, wherein a friction coefficient of the contact portion of the disk rotor and the rolling body decreases according to temperature increase of the holder or the rolling body.

7. The brake device according to claim 1, wherein
   the holder and the disk rotor are formed such that a relation between a friction coefficient μ1 of the contact portion of the disk rotor and the rolling body, a friction coefficient μ2 of the contact portion of the holder and the rolling body, and an angle β formed between a normal line of a wall surface of the holder in the contact portion of the holder and the rolling body and a direction of pressure of the pressing mechanism satisfy $\mu 1 > (\mu 2/2) \cdot [(2\beta/\sin 2\beta) + 1]$.

8. The brake device according to claim 1, wherein an angle formed between a normal line of a wall surface of the holder in the contact portion of the holder and the rolling body and the direction of pressure of the pressing mechanism increases according to temperature increase of the holder or the rolling body.

9. The brake device according to claim 1, wherein the disk rotor has an accommodating groove formed in the contact portion of the disk rotor and the rolling body in the direction of the relative displacement, and configured to accommodate a part of the rolling body.

10. The brake device according to claim 1, wherein the brake pad has a plurality of the rolling bodies and a plurality of the holders, and is provided with a distributing portion disposed between the holders and a support member to which pressure is applied by the pressing mechanism and configured to distribute the pressure.

11. The brake device according to claim 2, wherein the holder and the disk rotor are configured such that force with which the rolling body is rotated by the disk rotor is greater than force with which the rolling body is held by the holder.

12. The brake device according to claim 2, wherein a friction coefficient of the contact portion of the holder and the rolling body increases according to temperature increase of the holder or the rolling body.

13. The brake device according to claim 3, wherein a friction coefficient of the contact portion of the holder and the rolling body increases according to temperature increase of the holder or the rolling body.

14. The brake device according to claim 4, wherein a friction coefficient of the contact portion of the holder and the rolling body increases according to temperature increase of the holder or the rolling body.

15. The brake device according to claim 2, wherein a friction coefficient of the contact portion of the disk rotor and the rolling body decreases according to temperature increase of the holder or the rolling body.

16. The brake device according to claim 3, wherein a friction coefficient of the contact portion of the disk rotor and the rolling body decreases according to temperature increase of the holder or the rolling body.

17. The brake device according to claim 4, wherein a friction coefficient of the contact portion of the disk rotor and the rolling body decreases according to temperature increase of the holder or the rolling body.

18. A friction couple for a brake device, comprising:
a brake pad having at least one holder, each of the holder configured to be in contact with a corresponding rolling body and hold the rolling body rotatably; and
a disk rotor provided in contact with the rolling body and configured to rotate the rolling body in the holder according to a relative displacement with the brake pad, wherein
the rolling body is spherical,
the holder has a holding groove configured to hold the rolling body,
the holding groove has a shape of a cone or truncated cone, and
while the brake pad and the disk rotor are pressed against each other, the relative displacement of the brake pad and disk rotor is braked by frictional force generated between the rolling body and the holder when the disk rotor rotates the rolling body according to the relative displacement.

19. A brake pad, comprising:
a surface pressed against a disk rotor rotating together with a wheel; and
at least one holder provided on the surface, each of the holder configured to be in contact with a corresponding rolling body and hold the rolling body rotatably, wherein
the rolling body is spherical,
the holder has a holding groove configured to hold the rolling body,
the holding groove has a shape of a cone or truncated cone, and
while the brake pad is pressed against the disk rotor, a relative displacement between the brake pad and the disk rotor is braked by frictional force generated between the rolling body and the holder when the disk rotor rotates the rolling body according to the relative displacement.

* * * * *